United States Patent [19]

Gorton

[11] Patent Number: 5,027,787
[45] Date of Patent: Jul. 2, 1991

[54] SINGLE CAVITY GAS OVEN AND GRILL UNIT

[75] Inventor: Donald J. Gorton, Warley, Great Britain

[73] Assignee: Cannon Industries Limited, England

[21] Appl. No.: 567,288

[22] Filed: Aug. 14, 1990

[30] Foreign Application Priority Data

Aug. 16, 1989 [GB] United Kingdom ............... 8918673

[51] Int. Cl.⁵ ............................................. A21B 1/00
[52] U.S. Cl. .................................. 126/21 R; 126/42; 126/286; 126/287; 126/41 R
[58] Field of Search .............. 126/21 R, 21 A, 19 R, 126/273 R, 286, 285 R, 41 R, 39 R, 42, 287

[56] References Cited

U.S. PATENT DOCUMENTS 3,499,430  3/1970  Kemp ................................ 126/21 R
4,648,381  3/1987  Ishii et al. ......................... 126/286

FOREIGN PATENT DOCUMENTS 1223780   3/1971  United Kingdom .
1557655  12/1979  United Kingdom .
2144213   2/1985  United Kingdom .

Primary Examiner—James C. Yeung
Attorney, Agent, or Firm—Kirschstein, Ottinger, Isreal & Schiffmiller

[57] ABSTRACT

A single cavity gas oven and grill unit provided with an oven burner (14) and an independent grill burner (15). A flue (12) has a flap (16) pivotable between a closed position for the oven mode and an open position for the griling mode. The flap (16) is connected by a first linkage to a selector (13) and by a second linkage to a dual gas tap. For the oven mode the selector (13) closes the flap which in turn prevents the gas tap operating the grill. When the grill is on, the gas tap holds the flap open which in turn holds the selector in a position to prevent the oven door being closed.

7 Claims, 3 Drawing Sheets

SINGLE CAVITY GAS OVEN AND GRILL UNIT

BACKGROUND OF THE INVENTION

This invention relates to a single cavity gas oven and grill unit provided with an oven burner and an independent grill burner, a door at the front of the cavity and a flue at the rear of the cavity.

SUMMARY OF THE INVENTION

Since the grill burner is the more powerful, the flue area should be larger for the grilling mode than for the oven cooking mode and it should not be possible to operate the grill burner unless that larger flue area is provided. Also, the front door should be held open when grilling.

An object of the invention is to provide a simple mechanical arrangement which meets the just stated requirements.

According to the invention there is provided a single cavity gas oven and grill unit provided with an oven burner and an independent grill burner, a door at the front of the cavity and a flue at the rear of the cavity. The flue is provided with a flap pivotable between a closed position for use with the oven burner on and an open position for use with the grill burner on. The flue flap is connected by a first mechanical linkage to a user operable flap position selector and by a second mechanical linkage to a user operable gas tap. When the selector is operated to the oven position the flue flap is closed via the first linkage and, in turn via the second linkage, prevents the gas tap being turned to operate the grill burner. When the selector is operated to the grill position the flue flap is opened via the first linkage and, in turn via the second linkage, enables the gas tap to be turned to operate the grill burner. When the grill burner is on the flue flap is held open by the gas tap via the second linkage and, in turn via the first linkage, holds the selector in a position which prevents closure of the front door.

The selector may be manually operable, when the grill burner is not on, to open or close the flue flap via the first linkage.

A stop bar on an end of the second linkage and a cam plate on the gas tap may be provided such that, when the flue flap is closed, the stop bar prevents the cam plate being turned to operate the grill burner; and such that, when the grill burner is on, the cam plate holds the stop bar so as to hold the flue flap open.

The arrangement may be such that in the closed position of the flap the flue is fully closed; in which case additional, permanently open, flue space is provided sufficient for when the oven burner is on.

BRIEF DESCRIPTION OF THE DRAWINGS

An embodiment of a single cavity gas oven and grill unit according to the invention will now be described in detail, by way of example, with reference to the accompanying diagrammatic drawings, in which.

DETAILED DESCRIPTION OF THE PREFERRED EMBODIMENT

Figure 1:
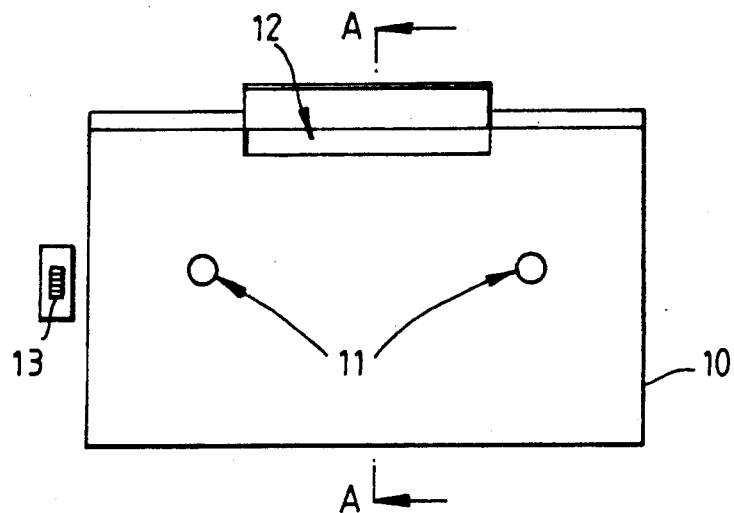
FIG. 1 is a partial front elevation of the unit, with the door removed for clarity.
Figure 2A:
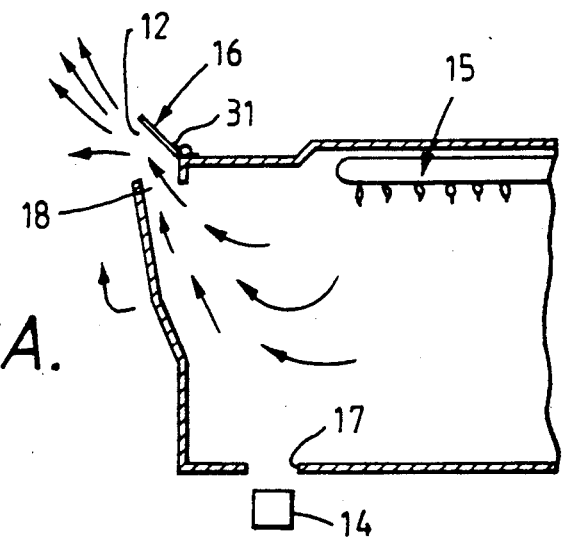
FIGS. 2A and 2B are partial vertical sections on the line A—A of FIG. 1, showing respectively the unit in its grilling mode and its oven cooking mode.
Figure 2B:
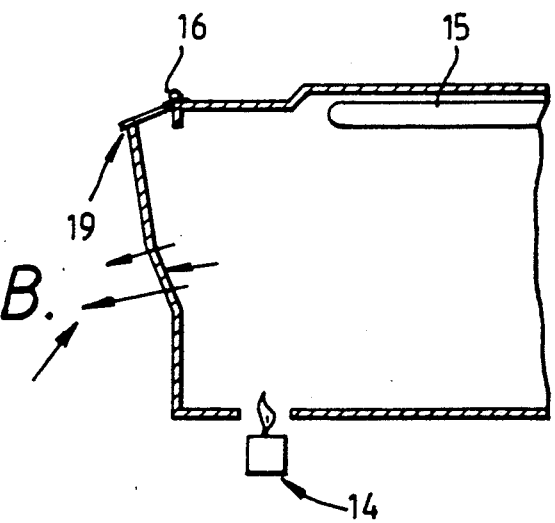

Referring now to FIGS. 1, 2A and 2B, a rectangular box-shaped gas oven/grill unit cavity has a drop-down front door which seals the cavity. An oven burner 14 heats the cavity through an aperture 17 in the floor at the rear, and a larger-powered grill burner 15 is mounted in a recess in the roof. Permanently open outlet flue apertures 11 are formed in the rear wall 10, and are of sufficient and optimum size for cooking with the door closed and the cavity sealed, with only the oven burner 14 on, as shown in FIG. 2B.

A much larger, variable area outlet flue 12 is formed along the top rear edge of the oven cavity, by means of a rectangular opening 18 selectively blocked by a cover in the form of a flap 16. The maximum area of this variable flue 12 is the optimum for the use of the grill burner 15 without the oven burner 14, with the door open, as shown in FIG. 2A, in which the arrows represent waste gas flow.

Figure 3A:
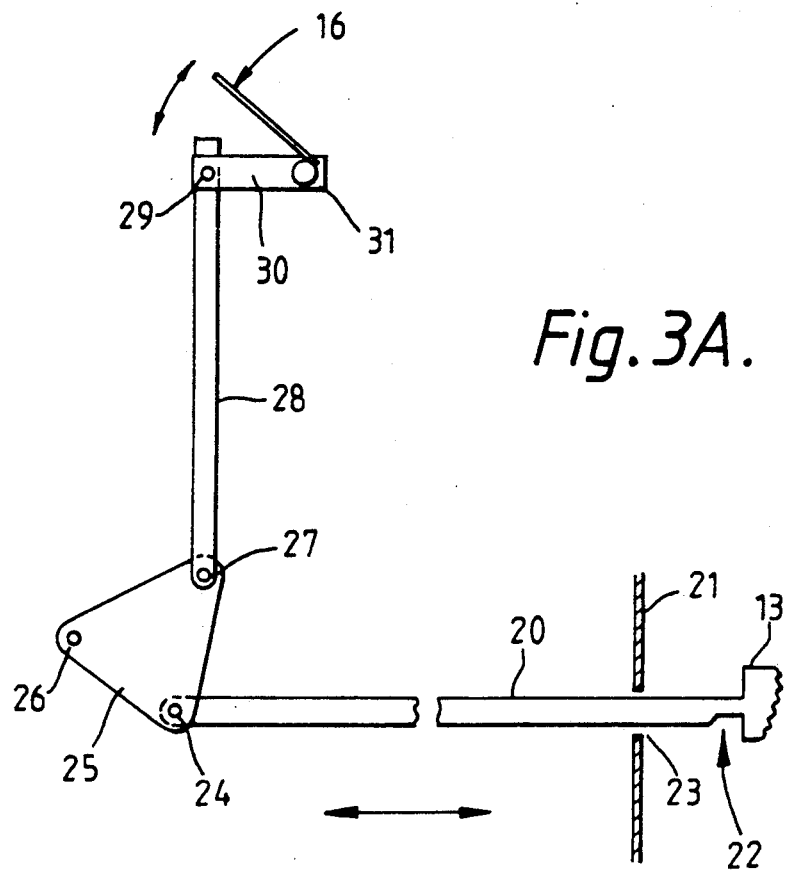
FIGS. 3A and 3B are side elevations, to an enlarged scale of a mechanical control linkage between a flue flap and a manually operable selector knob, showing respectively the unit in its grill mode and its oven cooking mode.
Figure 3B:
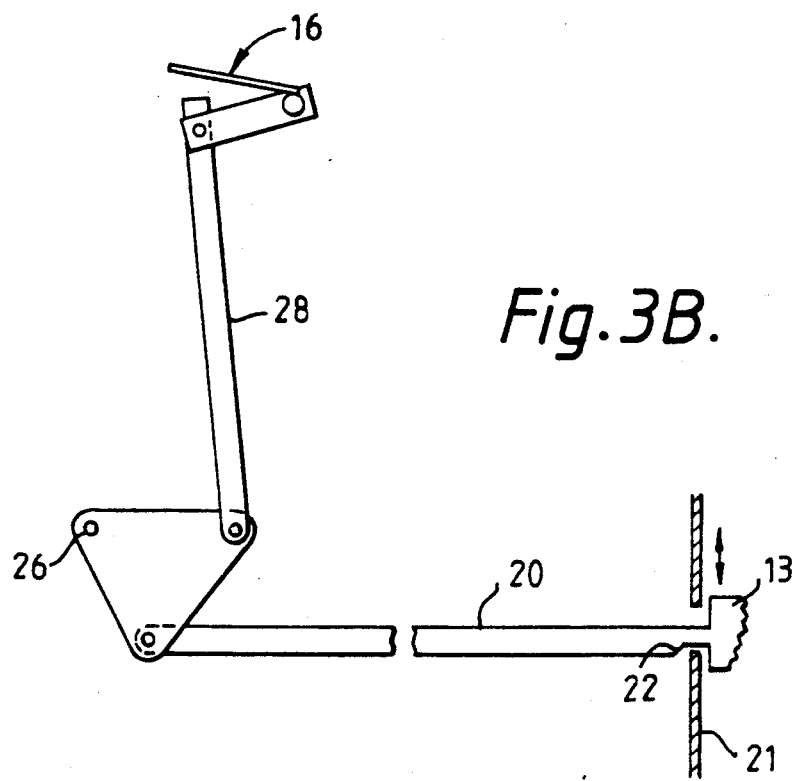
Figure 4:
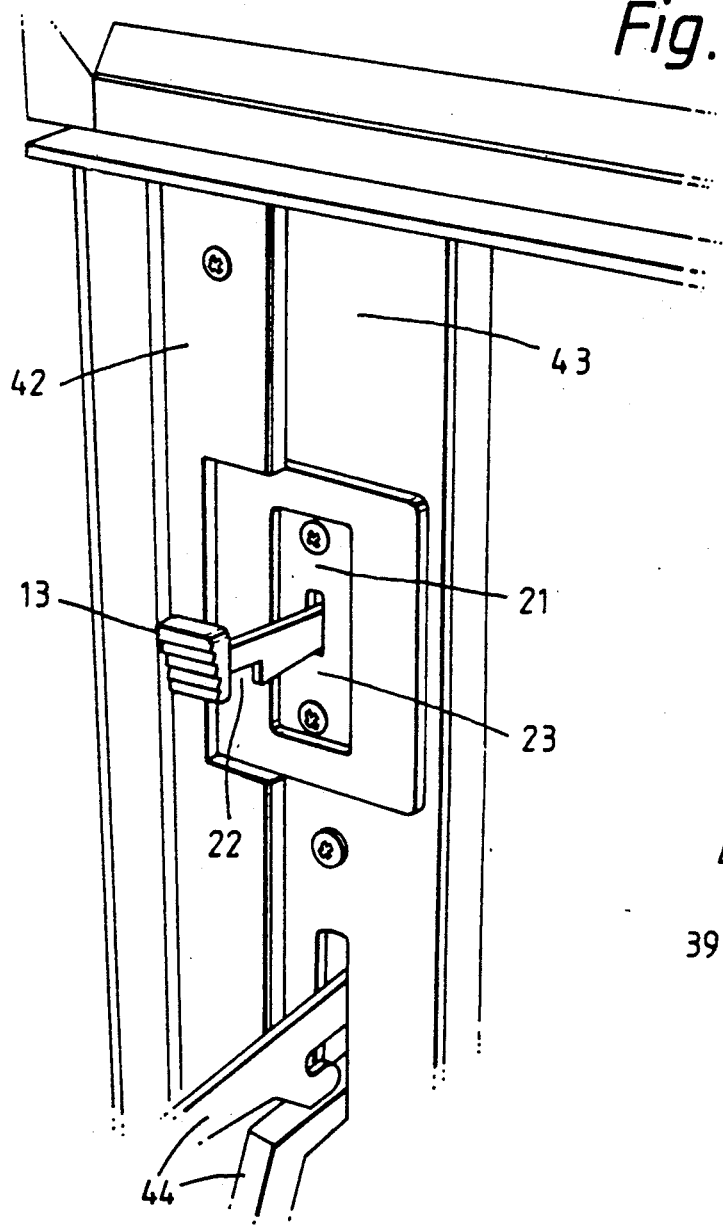
FIG. 4 is a front perspective view, to a greatly enlarged scale, of the left hand side of the oven door rebate, showing the flue selector knob and part of the door hinge.
Figure 5:
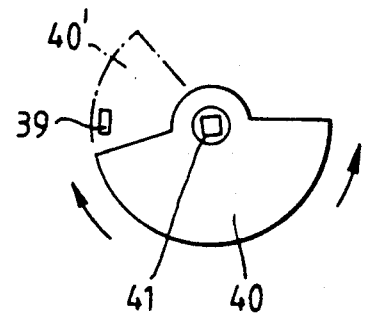
FIG. 5 illustrates part of a dual control single gas tap.
Figure 6:
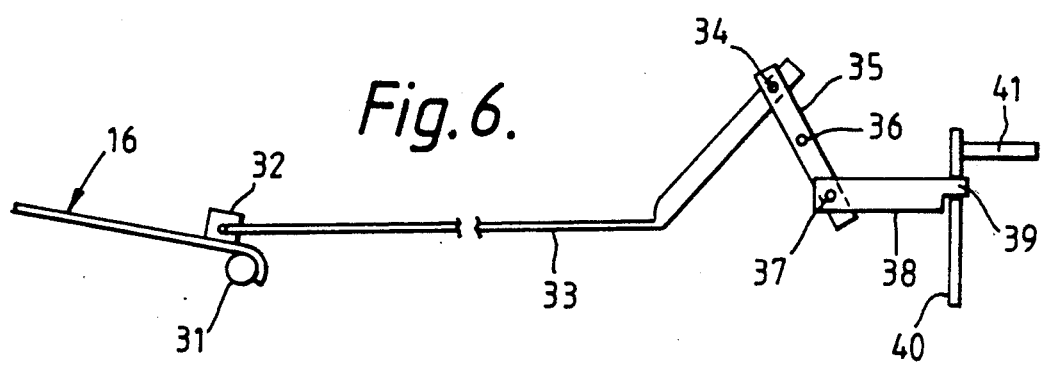
FIG. 6 is a side elevation of a mechanical control linkage between the flue flap and the gas tap.

The cover flap 16 is horizontally pivoted along one edge at 31, and is connected rigidly to two separate mechanical control linkages, outside the cavity but within an outer housing, one for a manual flap control and door interlock, shown in FIGS. 3A, 3B and 4, and the other for a gas tap control interlock shown in FIGS. 5 and 6.

With reference to FIGS. 3A, 3B and 4, the flue flap 16 is connected by a first mechanical linkage to a flap position selector 13. The flue flap 16 is connected rigidly to a horizontal arm 30 pivotally connected at 29 to a longer, vertical arm 28 which in turn is pivotally connected at 27 to a triangular link 25. The link 25, pivoted to a fixed point at 26, is also pivotally connected at 24 to a reciprocable horizontal arm 20 outside the cavity side, which arm 20 projects through an aperture in part of the door rebate frame 21 (see FIG. 4). The arm 20 terminates at a manually-operable selector knob 13 with a finger-grip outer surface. A notch recess 22 in the underside of the horizontal arm 20 adjacent the knob 13 serves to latch the arm in its rearmost position (FIG. 3B), the sides of the recess being stopped by the lower edge 23 of the rebate frame 21. At this position, the flue control flap 16 is fully closed, and seals the variable flue by means of a seal 19 (FIG. 2B). The flap 16 is opened manually by pushing upwardly the knob 13 to release the arm 20, and allowing the arm 20 to travel outwardly to its fully-projecting position (FIG. 3A) at which the flap 16 is fully open. This is assisted by a spring (not shown) biasing anti-clockwise the triangular link 25, and/or a spring biasing open (clockwise in FIG. 3A) the flap 16. When the knob 13 is retracted, it is flush with the door seal 42 in the door rebate 43, allowing the door to close fully.

With reference to FIGS. 5 and 6, the gas supply to both burners 14, 15 is controlled by a single, dual-control gas tap operated by a control knob via a spindle 41.

Over one range of its rotary movement, the tap regulates gas to the oven burner 14, and, over a different range, it regulates gas to the grill burner 15, so that the burners are never both on. The spindle 41 turns a cam plate 40 which is freely movable except when its radial edge is obstructed by an interlock stop bar 39 linked to the motion of the flue control flap 16. The flue flap 16 is connected by a second mechanical linkage to the gas tap. The flap 16 is pivotally connected at 32 to an arm 33 which is pivotally connected 34 to a lever arm 35 centrally pivoted to a fixed point 36. The other end of the lever arm 35 is pivotally connected at 37 to control arm 38 whose end is integral with the interlock bar 39.

When the selector 13 is operated to the oven position to close the flue flap 16 via the first linkage, then the closed flue flap 16 causes the stop bar 39, via the second linkage, to prevent the gas tap being turned to operate the grill burner. When the selector 13 is operated to the grill position to open the flue flap 16 via the first linkage, then the open flue flap 16 retracts the stop bar 39, via the second linkage, to allow the gas tap to be turned to operate the grill burner. Once the gas tap is turned clockwise and the grill is on, the cam plate 40 (as shown in dotted position 40') covers the interlock stop bar 39 and thereby holds the flap 16 open. This prevents inadvertent closure of the larger flue 12 while the grill is on. With the flue flap 16 thus held open by the gas tap, then in turn via the first linkage it holds the selector knob 13 in a position which prevents closure of the front door, hinged at 44 as shown in FIG. 4, so as to allow air to enter the cavity while the grill is on. Once the grill is turned off, the flap 16 is no longer held open, and it may be closed by pushing in the knob 13, either manually or else by pushing the oven door shut.

It is possible for the user to turn the gas tap anticlockwise to operate the oven burner while the flue flap 16 is open. However, this would give poor performance and users would have instructions to tell them to latch the selector 13 in the notch 22 and close the oven door before turning on the oven burner.

In the normal unused condition of the unit the oven door will be closed, which will keep the flap 16 closed which will prevent the grill burner being turned on.

An alternative to having the selector 13 manually operable would be to arrange for this selector to be operated by opening and closing the oven door.

I claim:
1. An oven/grill unit, comprising:
(a) a frame generally lying in a plane;
(b) a single cooking/grilling cavity having a front and a rear;
(c) a door mounted at the front of the cavity for movement between a door-open position and a door-closed position, said door overlying the frame in the door-closed position;
(d) a gas oven burner for heating the cavity in a cooking mode of operation during which the door is in the door-closed position;
(e) a gas grill burner for heating the cavity in a grilling mode of operation during which the door is in the door-open position;
(f) a rotary gas tap for supplying gas to the oven burner and the grill burner;
(g) a grill flue including a flap mounted at the rear of the cavity for movement between a flap-open position and a flap-closed position; and
(h) mode selector means for moving the flap to the flap-closed position, and for preventing operation of the grill burner, during the cooking mode, and said mode selector means being further operative for moving the flap to the flap-open position, for preventing operation of the oven burner, and for preventing movement of the door to the door-closed position, during the grilling mode, said mode selector means including
(i) a selector knob displaceable away from the plane of the frame to, and held in, an extended door-blocking position in which the knob obstructs movement of the door to the door-closed position in the grilling mode,
(ii) a first force-transmitting linkage operatively connected between the flap and the selector knob, said first linkage being operative for pivoting the flap about a pivot axis in response to reciprocatingly displacing the selector knob in a direction generally perpendicular to the plane of the frame, and
(iii) a second force-transmitting linkage operatively connected between the flap and the tap for pivoting the flap about the pivot axis in response to rotation of the gas tap, said second linkage including a first elongated arm having one end pivotably connected to the flap, and an opposite end pivotably connected to one end of a lever having an opposite end pivotably connected to a control arm, said lever having a fixed pivot intermediate the opposite ends of the lever.

2. The oven/grill unit as claimed in claim 1, wherein the cavity has a floor at which the overn burner is mounted, and a roof at which the grill burner is mounted.

3. The oven/grill unit as claimed in claim 1, wherein the cavity has a rear wall and permanently-open flue apertures extending from the cavity through the rear wall.

4. The oven/grill unit as claimed in claim 1, wherein the first linkage includes a first arm connected to the flap, a second elongated arm having one end pivotably connected to the first arm, and an opposite arm pivotably connected at a pivot point to a link, a third elongated arm having one end pivotably connected at another pivot point to the link, and an opposite end supporting the selector knob; and wherein the link turns about a fixed pivot spaced from said pivot points.

5. The oven/grill unit as claimed in claim 4, wherein the third arm has a notch for latchingly engaging the frame and holding the selector knob in the extended position.

6. The oven/grill unit as claimed in claim 4, wherein the control arm has a stop bar movable into and out of a path of rotary movement of a cam plate that rotates with the gas tap, said bar blocking rotation of the cam plate to prevent gas from being supplied to the grill burner in the flap-closed position, said cam plate holding the stop bar and holding the flap in the flap-open position to permit gas to be supplied only to the grill burner.

7. The oven/grill unit as claimed in claim 6, wherein the gas tap is manually rotatable, and wherein the knob is manually displaceable.

* * * * *